United States Patent [19]

Kobayashi

[11] 4,401,504

[45] Aug. 30, 1983

[54] JOINING APPARATUS

[75] Inventor: Kazuhiko Kobayashi, Minami-ashigara, Japan

[73] Assignees: Fuji Photo Film Co., Ltd., Kanagawa; Mitomo Co., Ltd., Tokyo, both of Japan

[21] Appl. No.: 296,023

[22] Filed: Aug. 25, 1981

[30] Foreign Application Priority Data

Aug. 29, 1980 [JP] Japan ............................ 55/122473[U]

[51] Int. Cl.³ ...................... B31F 5/06; G03D 15/04
[52] U.S. Cl. ................................ 156/505; 156/304.3; 156/506
[58] Field of Search ............... 156/157, 159, 304.3, 156/304.6, 505, 506, 583.1, 502

[56] References Cited

U.S. PATENT DOCUMENTS

| | | | |
|---|---|---|---|
| 3,709,759 | 1/1973 | Hyca | 156/506 |
| 3,913,433 | 10/1975 | Matthews | 156/505 |
| 3,947,307 | 3/1976 | Buchscheidt | 156/73.1 |

Primary Examiner—Michael G. Wityshyn
Attorney, Agent, or Firm—Sughrue, Mion, Zinn, Macpeak and Seas

[57] ABSTRACT

A joining apparatus having a joining table with an adhesion preventing member on its upper surface. A joining head is movable downwardly toward said joining table to press materials to be joined and a joining tape against said joining table. A support for the joining table is provided in such a way that its upper surface may follow the movement of the lower surface of the joining head and can be brought into intimate contact therewith.

8 Claims, 2 Drawing Figures

JOINING APPARATUS

BACKGROUND OF THE INVENTION

This invention relates to a joining apparatus, and more particularly, to a joining apparatus for use in the splicing of photographic film.

It is known in the art to join pieces of photographic film or other material one after another to form an elongated assembly which is suitable for development or other purposes. In the splicing of photographic film, the rear edge of a preceding piece of film and the front edge of a succeeding piece of film are positioned on a joining table. A heat sensitive joining tape is applied onto the adjacent edges of the two pieces of film, and a heating head is lowered to heat the joining tape under pressure. The joining table has an upper surface covered with a material which prevents the fusion or adhesion of the adhesive in the joining tape to the joining table. For this purpose, it is customary to employ, for example, a release agent containing a fluororesin, such as Teflon (TF), as a base. When the heating head is lowered onto the stationary joining table, however, it is sometimes difficult to ensure parallelism of the mating surfaces, since the film and the joining tape are present therebetween. This can also happen if the apparatus or its installation lacks dimensional accuracy. Accordingly, the fusion preventing material on the joining table is often likely to be partially worn, or otherwise deformed, resulting in malfunctioning of the apparatus. It is, for example, imperative to change the fusion preventing material frequently in order to ensure satisfactory operation of the apparatus.

SUMMARY OF THE INVENTION

In view of the aforesaid drawbacks of the prior art, it is an object of this invention to provide a joining apparatus which always ensures satisfactory surface contact between a heating head and a joining table.

It is another object of this invention to provide a thermal joining apparatus that eliminates partial wear or deformation of the fusion preventing material.

According to this invention, the aforesaid objects are attained by the provision of a pivot member on which the joining table is supported so that it may gimbal to adapt its upper surface to be parallel to the lower surface of the heating head. This arrangement makes it possible to compensate for any dimensional inaccuracy or error in the fabrication of the apparatus. The invention also insures intimate contact between the mating surfaces of the heating head and the joining table. There is no partial wear or deformation of the fusion preventing material, yet a high degree of reliability is maintained in the joining operation.

The invention will now be described by way of example with reference to the drawings.

BRIEF DECRIPTION OF THE DRAWINGS

FIG. 1 is a perspective view of a thermal joining apparatus embodying this invention; and FIG. 2 is a vertical sectional view of the essential part of the apparatus shown in FIG. 1.

DESCRIPTION OF THE PREFERRED EMBODIMENT

Figure 1:
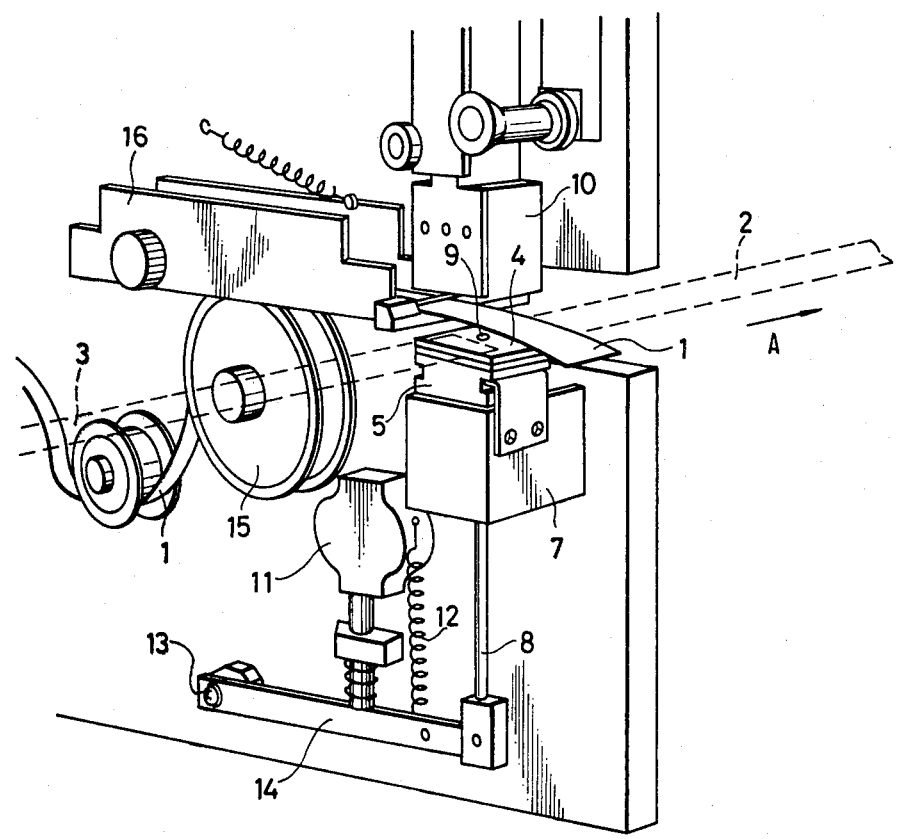
Figure 2:
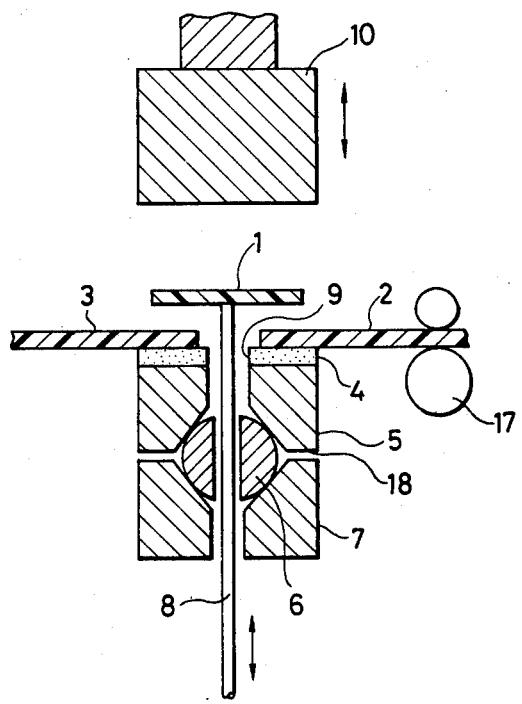

FIG. 1 is a perspective view of a joining apparatus embodying this invention. Such apparatus uses typically thermal joining techniques. A heat-sensitive joining tape 1 is supplied into the space between a joining table 5 and a heating head 10 past a guide roller 15 and a guide member 16. The joining table 5, as shown in FIG. 2, is supported by a member 6 on a stationary member 7. The member 6 also allows the table 5 to gimbal since it is caged between members 6 and 7. The joining table 5 has an upper surface covered with a fusion preventing material 4, on which the adjacent edges of the materials to be joined, such as the rear edge of a preceding piece of photographic film 2 and the front edge of a succeeding piece of photographic film 3, are positioned. The fusion preventing material 4 is composed of a release agent containing a fluoresin as a base, for example, one known under the name of Teflon (TM), and prevents the fusion of the adhesive in the joining tape 1 to the joining table 5 when the tape 1 is heated. The fusion preventing material 4 prevents adhesion of the adhesive to an exposed surface portion of the joining table 5 in a gap between the rear edge of the film 2 and the front edge of the film 3 which are spaced a predetermined distance from each other.

The joining tape 1 has a leading edge supported by a stop, not shown, and when it has arrived at a position above the adjacent edges of the films 2 and 3, it is cut to a predetermined length by a cutter, not shown.

The heating head 10 is vertically movable to exert pressure on the joining table 5. A round bar 8, a guide member for the joining tape, is vertically slidable through the fusion preventing material 4, the member 6, joining table 5 and the stationary member 7. When the joining tape 1 has arrived at a position above the joining table 5, the round bar 8 projects upwardly through the fusion preventing material 4, and supports the joining tape 1 exactly above the adjacent edges of the films 2 and 3 to be joined. The round bar 8 has a lower end supported rotatably on one end of a lever 14, while the other end of the lever 14 is rotatably supported by a pin 13. A spring 12 is connected to the lever 14 to urge the round bar 8 upwardly, while a plunger 11 is provided to urge the lever 14 downwardly to lower the round bar 8.

Referring now to FIG. 2, the essential parts of the thermal joining apparatus according to this invention are shown. The preceding film 2 is moved by a feed roll 17 in the direction of an arrow A in FIG. 1. The joining table 5 is supported by the member 6 on the stationary member 7 as already stated. The member 6 has a spherical shape, and is mounted in a conical recess in the stationary member 7. The joining table 5 is provided in its lower portion with a conical recess in which the spherical member 6 is slidably received. The joining table 5 is spaced apart from the stationary member 7 as shown at space 18, so that the former may be movable relative to the latter to allow for gimballing about member 6. The joining table 5, the member 6 and the stationary member 7 are provided therethrough with a continuous hole 9 through which the round bar 8 is vertically movable.

The arrangement as hereinabove described always ensures snug or intimate contact between the mating surfaces of the joining table 5 and the heating head 10. Even if the heating head 10 having a lower surface which is not horizontal has been lowered to press the joining tape 1 and the photographic films 2 and 3 against the joining table 5, the joining table 5 is movable on the member 6 to the extent that it rotates on member 6 and makes up for the inclination of the lower surface of the heating head 10. Hence, parallelism of their mating surfaces may be obtained by having the joining table 5 move to align with head 10. Accordingly, it is possible to accomplish the joining operation satisfactorily, and prevent any partial wear or defomation of the fusion preventing material.

The joining apparatus of this invention is not only useful for thermal joining, but is also applicable to other methods of joining, for example, employing a pressure-sensitive joining tape if the upper surface of the joining table is covered with an appropriate material which prevents adhesion of the tape to the joining table. The member 6 does not always need to be spherical, but may also be of any other shape if it can realize the results which have hereinbefore been described. For example, it is possible to employ elastic material in a box, and mount an appropriately modified form of the joining table 5 loosely on the elastic material, if the elastic material permits the joining table to follow the movement of the heating head, and can withstand the pressure exerted thereon during the joining operation.

The thermal joining apparatus of this invention exhibits particularly outstanding results if it is applied to a photographic film splicer as disclosed in copending U.S. application, Ser. No. 296,022 filed by the same applicant on the same date, now U.S. Pat. No. 4,368,096.

What is claimed is:

1. In a joining apparatus having a joining table with an adhesion preventing member on its upper surface and a joining head movable downwardly toward said joining table to press materials to be joined and a joining material against said joining table, the improvement comprising; means for supporting said joining table in a pivotable manner, wherein the upper surface of the joining table may follow the movement of the lower surface of the joining head to provide intimate contact therewith; and a movable guide member for said joining material, said guide member projecting through said joining table and said means for supporting to support said joining material at a point above adjacent edges of the materials to be joined.

2. The joining apparatus of claim 1, wherein said means for supporting comprises a stationary member positioned below and spaced from said joining table and a caged member positioned between said joining table and said stationary member.

3. The joining apparatus of claim 2, wherein said stationary member and said joining table each have inwardly tapered sides to constrain said caged member.

4. The joining apparatus of claim 3, wherein said caged member comprises a circular member contacting said tapered sides.

5. In a joining apparatus having a joining table with an adhesion preventing member on its upper surface and a joining head movable downwardly toward said joining table to press materials to be joined and a joining material against said joining table, the improvement comprising; means for supporting said joining table in a pivotable manner comprising a stationary member positioned below and spaced from said joining table, a caged member positioned between said joining table and said stationary member, and a movable guide member for said joining material, said guide member projecting through said joining table and said means for supporting to support said joining material at a point above adjacent edges of said material to be joined, wherein the upper surface of the joining table may follow the movement of the lower surface of the joining head to provide intimate contact therewith, said stationary member and said joining table each have inwardly tapered sides to constrain said caged member, and wherein said caged member comprises a circular member contacting said tapered sides.

6. The joining apparatus of claim 1 or 5, wherein said means for supporting comprises a stationary member positioned below and spaced from said joining table and having a passage for said guide member and, a caged member positioned between said joining table and said stationary member, said caged member having a passage aligned with the passage in said stationary member to permit said guide member to pass through.

7. The joining apparatus of claim 1, wherein said caged member comprises a circular member having said passage axially placed therethrough.

8. The joining apparatus of claim 1 or 5, wherein said material to be joined moves over said joining table in one direction and, means to feed said joining material in a second direction perpendicular to said one direction with said first and second directions intersecting over said joining table.

* * * * *